Nov. 25, 1969    J. G. TROY    3,479,686
HIDE REMOVAL DEVICE
Filed Feb. 6, 1967    2 Sheets-Sheet 1
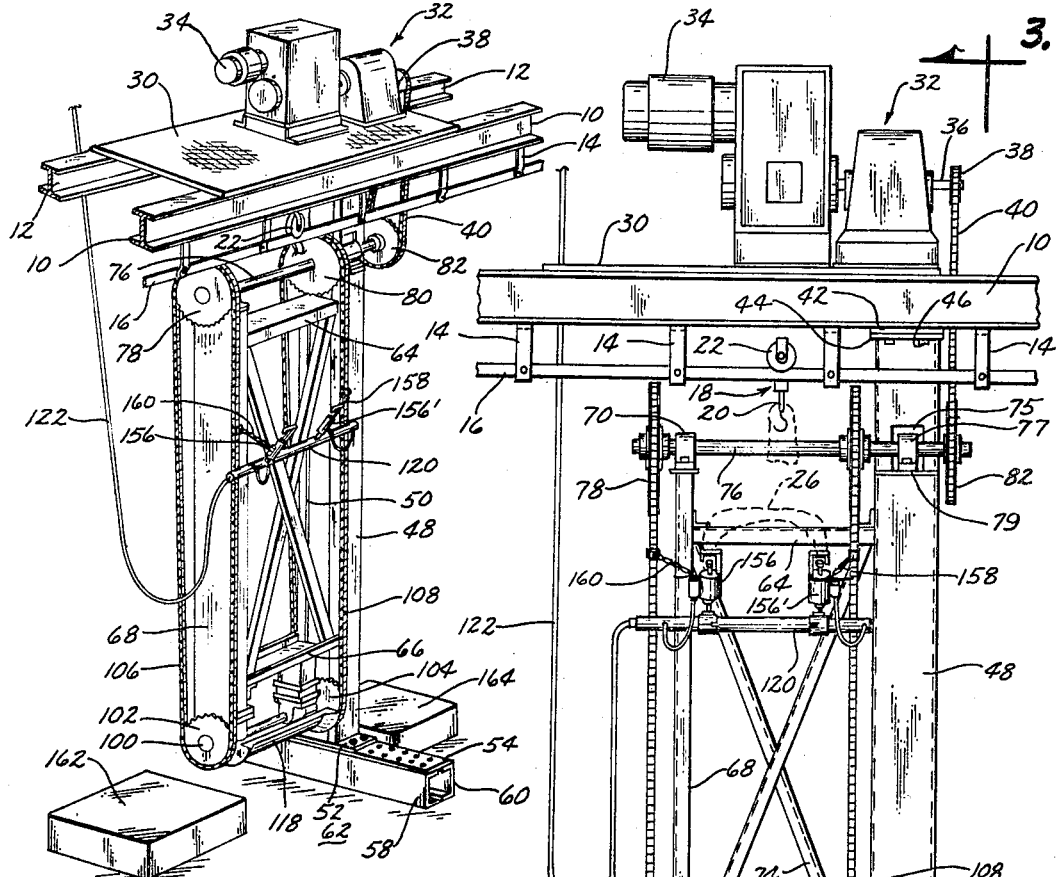
Fig. 1
Fig. 2
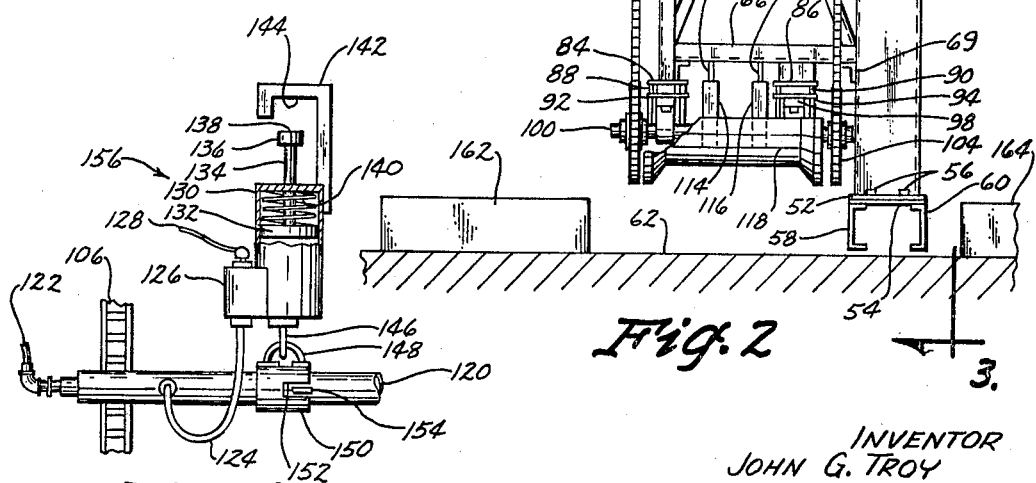
Fig. 4
INVENTOR
JOHN G. TROY
BY
Dick, Zarley, McKee & Thomte
ATTORNEYS

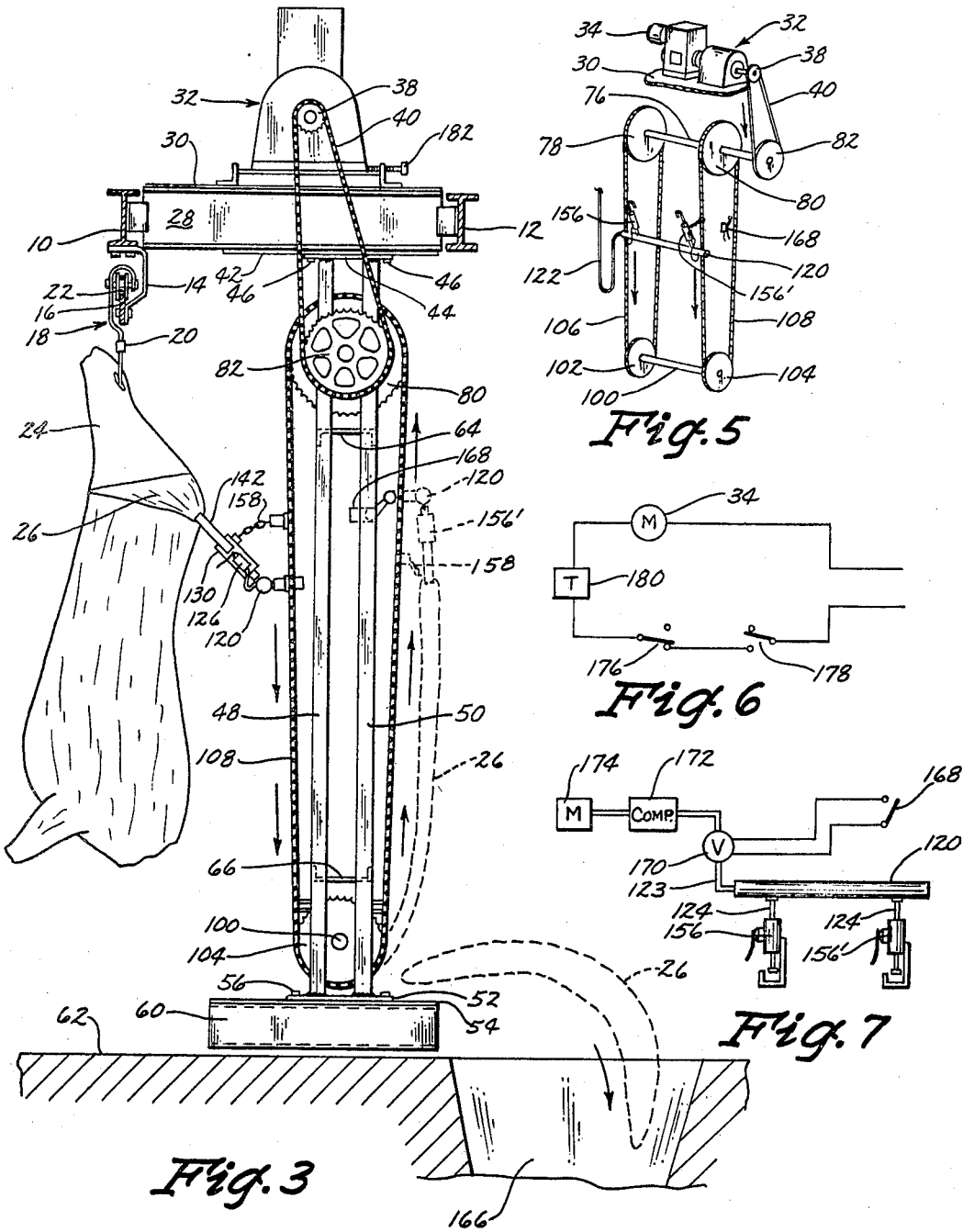

United States Patent Office 3,479,686
Patented Nov. 25, 1969

3,479,686
HIDE REMOVAL DEVICE
John G. Troy, 7529 Grover St., Omaha, Nebr. 68124
Filed Feb. 6, 1967, Ser. No. 614,206
Int. Cl. A22b 5/16
U.S. Cl. 17—21                                5 Claims

ABSTRACT OF THE DISCLOSURE

A hide removal device comprising a pair of hide grippers secured to a chain assembly which is movably mounted on an adjustable frame means, the chain assembly being moved on the frame means in a manner so as to remove the hide from an animal carcass in a downwardly direction with respect thereto to avoid contamination of the carcass.

---

Hides are usually removed from the animal carcass by hand or by attaching chains to the hide and pulling the hide upwardly from the carcass. Obviously, the hand operation is not economically feasible. The hide removal devices which pull the hide upwardly from the carcass are generally unsatisfactory since dirt or other material falls from the hide onto the carcass as the hide is being pulled upwardly therefrom and thus causes contamination of the carcass.

Therefore, it is a principal object of this invention to provide a hide removal device which removes the hide from an animal carcass in a downwardly direction with respect thereto to avoid contamination of the carcass.

A further object of this invention is to provide a hide removal device which includes a pair of pneumatically operated hide grippers which are secured to a chain assembly which is movably mounted on an adjustable frame means.

A further object of this invention is to provide a hide removal device which permits adjustment between the dressing rail and the hide removal device.

A further object of this invention is to provide a hide removal device having means thereon which automatically disengages the hide therefrom after the hide has been removed from the carcass.

A further object of this invention is to provide a hide removal device which occupies a minimum amount of floor space.

A further object of this invention is to provide a hide removal device having a shield means provided thereon which prevents the hide from becoming entangled with the chain mechanism and also maintains the hide in alignment while it is being removed from the carcass.

A further object of this invention is to provide a hide removal device which permits a rapid removal of the hide.

A further object of this invention is to provide a hide removal device which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the hide removal device;

FIG. 2 is a front elevational view of the device;

FIG. 3 is a right side elevational view of the device, the broken lines indicating the position of the hide during various stages of its removal;

FIG. 4 is a fragmentary front view of one of the hide grippers with portions thereof cut away to more fully illustrate the invention;

FIG. 5 is a perspective view illustrating the mechanical power train;

FIG. 6 is a schematic view illustrating the electrical control system; and

FIG. 7 is a schematic view illustrating the air control system for the hide grippers.

The numerals 10 and 12 designate a pair of horizontally disposed rail beams which are of typical I beam construction. Beams 10 and 12 are suspended from any suitable support means and as such, do not form a part of this invention. A plurality of hangers 14 are secured to the bottom flange of rail 10 by bolts or the like and have a trolley rail 16 secured thereto. Trolley rail 16 extends from a main trolley rail system as is conventional in the large majority of slaughter houses. Trolley rail 16 is adapted to support a meat hook 18 including a swivel 20 and a roller 22 which engages trolley rail 16 as seen in FIGS. 2 and 3. The numeral 24 generally designates a beef carcass including a hide 26. A rail beam 28 is secured to beams 10 and 12 by welding or the like and extends therebetween as best illustrated in FIG. 3. Platform 30 is rigidly mounted on beams 10, 12 and 14 and supports a conventional variable speed drive 32 which is powered by an electric encapsulated motor 34 preferably of the 220–440 volt type. Drive 32 has a drive shaft 36 extending therefrom upon which is mounted a sprocket 38 adapted to receive a chain 40 extending therearound.

A slide plate 42 is bolted to the bottom of rail beam 28 and has a plurality of bolt openings (not shown) formed therein. A plate 44 is horizontally adjustably secured to slide plate 42 by means of bolts 46 extending through plate 44 and the bolt openings in slide plate 42. A pair of spaced apart channel members 48 and 50 are welded to the bottom surface of plate 44 and extend downwardly therefrom. The lower ends of channel members 48 and 50 have a plate 52 welded thereto which is adapted to be horizontally adjustably secured to a slide plate 54 by means of bolts 56. A pair of channel members 58 and 60 are welded to the bottom surface of slide plate 54 and as seen in FIG. 2 are designed so that the lower ends thereof are spaced above the floor surface 62 to permit the accommodation of slight variances in the floor surface. A plurality of shims (not shown) are normally positioned between the lower ends of channels 58 and 60 and the floor surface 62 to level the apparatus and to aid in the support thereof. Preferably, the bolt openings in slide plate 42, plate 44 and plate 52, slide plate 54 are arranged in three inch increments to permit the channel members 48 and 50 and hence the remainder of the apparatus to be moved in horizontal three inch increments with respect to the trolley rail 16 to accommodate various carcass sizes, etc.

A pair of spaced apart channel members 64 and 66 are welded to the side of channel members 48 and 50 and extend horizontally therefrom as best illustrated in FIG. 2. Welded to the other ends of channel members 64 and 66 is a vertically disposed channel member 68 having a pillow block bearing 70 mounted on its upper end. A pair of cross braces 72 and 74 are welded to channel members 64 and 66 in the manner seen in FIG. 2 to add stability to the device. As also seen in FIG. 2, a plurality of angle braces 69 are provided to strengthen the device.

An opening 75 is provided in channel member 48 and a similar opening is provided in channel member 50 to facilitate a pillow block bearing 77 being received therein. A plate base 79 is welded to channel members 48 and 50 and bearing 72 is bolted thereto. Shaft 76 is rotatably mounted in bearings 70 and 77 (FIG. 2) and has sprockets 78 and 80 mounted thereon at one side of channel members 48 and 50 and has a drive sprocket 82 mounted thereon at the other side of channel members 48 and 50. As seen in FIG. 2, chain 40 extends around sprocket 82 to cause the rotation of shaft 76 and sprockets 78 and 80 upon the activation of motor 34.

A plate 84 is welded to the lower end of channel member 68 and a plate 86 is welded to channel member 66 as illustrated in FIG. 2. Plates 84 and 86 have a plurality (preferably 4) of threaded stud bolts 88 and 90 welded thereto respectively and extending downwardly therefrom. Plates 92 and 94 are vertically adjustably mounted on bolts 88 and 90 respectively by means of lock nuts and have pillow block bearings 96 and 98 secured thereto respectively. Shaft 100 rotatably extends through and between bearings 96 and 98 and has sprockets 102 and 104 mounted at opposite ends thereof. Chain 106 extends around and between sprockets 78 and 102 while chain 108 extends around and between sprockets 80 and 104.

A pair of adjustable bolts 110 and 112 are secured to channel member 66 and extend downwardly therefrom (FIG. 2) and have stiffener ribs 114 and 116 secured thereto respectively. A shield 118 is secured to stiffener ribs 114 and 116 by any convenient means such as welding or the like and as seen in FIG. 2 extends around the lower end of shaft 100 to prevent the hide from becoming entangled with the chain mechanism as the hide is being pulled from the carcass.

A hollow air pipe 120 is operatively secured to chains 106 and 108 and extends therebetween as illustrated in FIGS. 1 and 2. The interior of pipe 120 is in communication with a source of compressed air (not shown) by means of air hose 122. Preferably, the source of compressed air is located above the apparatus for purposes of convenience. An air hose 124 is secured to pipe 120 and is in communication with the interior and extends to a valve 126 which is controlled by an "on-off" handle 128. Valve 126 is secured to and is in communication with an air cylinder 130 having a spring return piston 132 provided therein. A plunger 134 is secured to piston 132 and extends from air cylinder 130 as best seen in FIG. 4. Plunger 134 is provided with a head portion 136 having a serrated face 138. As seen in FIG. 4, a spring 140 in cylinder 130 urges piston 132 in a direction so as to cause plunger 134 to be normally retracted. A substantially U-shaped arm member 142 is secured to air cylinder 130 and is positioned so that head portion 136 will engage face 144 on member 142 upon the activation of valve 126. Eye bracket 146 is secured to one end of cylinder 130 and bracket 146 has a U-clamp 148 secured thereto which is connected to a pipe sleeve 150 which is slidably mounted on air pipe 120. Sleeve 150 is notched at 152 to receive a stop 154 which is welded to air pipe 120. For purposes of description, elements 120–154 will be described as hide gripper 156. A hide gripper 156' is secured to pipe 120 adjacent the other end thereof. Gripper 156' is identical to gripper 156 and will not be described in detail but identical scructure on gripper 156' will be designated " ' ".

A chain 158 is secured to hide gripper 156 and chain 106 and extends therebetween while a chain 160 extends between hide gripper 156' and chain 108. Chains 158 and 160 are sag limiting attachments designed to limit the sag of hide grippers 156 and 156' with respect to the chains 106 and 108 respectively.

In the drawings, the numerals 162 and 164 designate elevating platforms positioned at opposite sides of the device while the numeral 166 designates a hide chute.

FIG. 6 illustrates the electrical control system while FIG. 7 illustrates the air control system for the hide grippers. In FIG. 7, the numeral 168 designates a microswitch which is secured to either of channel members 48, 50 or 68 and illustrated in FIG. 3. In FIG. 7, an air valve in the air line 122, which is actuated by microswitch 168, is designated by the numeral 170 and the air compressor and motor therefor are indicated by the reference numerals 172 and 174 respectively.

With respect to FIG. 7, the motor 34 is shown to be series connected to switches 176 and 178 which will be located at opposite sides of the device for operation by the two operators of the device. It can be seen in FIG. 6 that both of the switches 176 and 178 must be in the "on" position before motor 34 will be energized but the motor 34 can be de-energized by the movement of one of the switches to be the "off" position.

In operation, the carcass gravitates into position for pulling by means of the trolley rail 16 and is temporarily disengaged from the main overhead conveyor system. The hide on both flanks of the carcass must be skinned down enough so that the two operators stationed on the elevating platforms 162 and 164 may attach the hide grippers 156 and 156' to the hide from each flank. The plunger 134 in the air cylinder 130 is normally in a retracted position and the hide is inserted between the serrated face portion 138 and surface 144 of the U-shaped arm member 142. As soon as the hide is so positioned, the operator manipulates handle 128 to close valve 126 which causes compressed air to be supplied to the interior of cylinder 130 to cause the extension of plunger 134. The extension of plunger 134 grips the hide between the serrated face portion 138 of head portion 136 and surface 144. The hide from the other flank of the carcass would be secured to hide gripper 156' in a fashion identical to that just described for hide gripper 156. As soon as both hide grippers 156 and 156' have been attached to the hide, the operators would close switches 176 and 178 which causes the activation of motor 34. The activation of motor 34 causes chains 106 and 108, air pipe 120 and hide grippers 156 and 156' to be rotated downwardly with respect to the animal carcass as illustrated by the arrows in FIG. 3. The pneumatic pressure within the air cylinders of the hide grippers prevents the hide from becoming disengaged therefrom. The hide grippers 156 and 156' move with respect to the carcass until the same has reached the approximate position as illustrated by broken lines in FIG. 3. When the hide grippers and the hide have reached the position illustrated by broken lines in FIG. 3, one of the hide grippers engages the microswitch 168 and causes the closing of the same. The closing of the microswitch 168 actuates valve 170 in the air line 122 which shuts off the source of compressed air from the compressor 172, and allows the compressed air in the air cylinders of the hide grippers 156 and 156' to be exhausted to the atmosphere, whereupon the spring loaded pistons of the hide grippers will release the hide. The hide then falls from the hide grippers into the chute 166 as illustrated by broken lines in FIG. 3. The hide grippers will again be actuated as soon as the microswitch 168 is passed, and the operators will manually exhaust the air from the air cylinders in the hide grippers 156 and 156' by actuating the valves 126 and 126' at the time the hide gripper is again placed on a carcass. In other words, the operators would open the valves 126 and 126' to open the hide grippers, and then close the valves 126 and 126' as soon as the hide was inserted in the U-shaped gripping portion.

hide grippers have travelled to a position where they

The operators can control the operation of the chain assembly by means of switches 176 and 178. After the hide has been dropped from the hide grippers and the can be attached to the next hide, the chain assembly will be stopped by merely opening one of the switches 176 or 178. FIG. 6 has illustrated a timer mechanism 180 which is an alternate device which can be used if desired to automatically stop motor 34 so that the hide grippers 156 and 156' will be stopped in a position to facilitate the attachment thereof to a hide. The structure described above for the control of the motor 34 as well as the control of the hide grippers can obviously be replaced by many different elements of structure to accomplish the particular phenomenon, but the control mechanism described above is the preferred control mechanism.

The shield 118 is adjustable with respect to the chain mechanism and serves to prevent the hide from becoming entangled with the chains and sprockets as the hide is pulled beneath the same. Shield 118 also serves to maintain the hide in alignment with the carcass as the hide is being pulled therebeneath to the position illustrated by broken lines in FIG. 3.

The device can be adjusted in a horizontal direction with respect to the trolley rail 14 by simply changing the relationship between the plates 42, 44 and plates 52, 54. This horizontal adjustment is preferably in three inch increments to permit the device to be horizontally adjusted to facilitate the removal of hides from various sizes of the carcasses. The variable speed drive 32 may also be horizontally adjusted in one direction by means of an adjusting screw 182 which permits the drive means 32 to be moved horizontally to maintain the proper tension in the chain 40 upon the horizontal movement of the device with respect to the trolley rail 14. As previously stated, shims or the like may be inserted beneath the lower ends of channel 58 and 60 to level the device and to add stability thereto.

Thus it can be seen that a device has been provided which quickly and conveniently removes a hide from an animal carcass in a downwardly direction with respect thereto. The fact that the hide is removed in a downwardly direction with respect to the carcass prevents dirt or the like from falling onto the carcass as the hide is being removed therefrom. Thus it can be seen that the device accomplishes at least all of its stated objectives.

Some changes may be made in the construction and arrangement of my hide removal device without departing from the real spirit and purpose of my invention, any modified forms of structure or use of mechanical equivalents which may be reasonably included.

I claim:

1. In a hide removal device,
a frame means,
a chain mechanism movably mounted on said frame means,
a hide gripper means on said chain mechanism adapted to grip a hide on a carcass suspended in a vertical condition adjacent thereto, and
a power means driving said chain mechanism whereby said hide gripper means is moved with respect to the carcass so as to remove the hide therefrom,
said hide gripper means being comprised of a pneumatically operated gripper element,
said frame means including a vertically disposed support having its upper end secured to a supporting means and its lower end adapted to be supported by a floor surface, a first shaft rotatably mounted on said support and extending horizontally therefrom, a second shaft operatively rotatably secured to said support below said first shaft, first and second spaced apart sprockets on said first shaft, third and fourth spaced apart sprockets on said second shaft, said chain mechanism including a first chain extending around and between said first and third sprockets and a second chain extending around and between said second and fourth sprockets, said first shaft having a drive sprocket thereon which is operatively connected to a power means to cause the rotation of said first and second chains with respect to said vertically disposed support, said supporting means having means thereon adapted to suspend a carcass in a substantially vertical condition adjacent said first and second chains, an air pipe secured to and extending between said first and second chains, said hide gripping means including first and second spaced apart pneumatically operated hide grippers operatively connected to said air pipe and adapted to grip the hide on the suspended carcass at times, and control means controlling the operation of said power means and said hide grippers.

2. The device of claim 1 wherein said vertically disposed support is horizontally adjustably secured to said supporting means to permit said first and second chains to be moved towards and away from the carcass at times.

3. In a hide removal device,
a frame means,
a chain mechanism movably mounted on said frame means,
a hide gripper means on said chain mechanism adapted to grip a hide on a carcass suspended in a vertical condition adjacent thereto, and
a power means driving said chain mechanism whereby said hide gripper means is moved with respect to the carcass so as to remove the hide therefrom,
said hide gripper means being comprised of a pneumatically operated gripper element,
said chain mechanism including first and second chain members, an air pipe secured to and extending between said chain members, said gripper element being secured to said air pipe, said air pipe facilitating the attachment of said gripper element to said chain mechanism and to facilitate the supply of air to said gripper element.

4. The device of claim 3 wherein a pair of spaced apart gripper elements are secured to said air pipe, each gripper element including an air cylinder, a piston in said air cylinder having a plunger secured thereto and extending outwardly of said chamber, an arm member secured to said cylinder and having a gripping portion thereof in the path of said plunger, and control means for causing said plunger to move towards said gripping portion, whereby the hide may be grasped between said gripping portion and said plunger upon operation of said control means, said gripping portion being U-shaped and adapted to receive said plunger.

5. The device of claim 3 wherein said control means includes a switch means in the movable path of said hide gripper means, said switch means being operatively connected to the source of pneumatic pressure which operates said hide gripper means to shut off the supply of pneumatic pressure thereto when said hide gripper means engages and closes the same.

References Cited

UNITED STATES PATENTS

| | | | |
|---|---|---|---|
| 2,885,726 | 5/1959 | Reser et al. | 17—21 |
| 3,308,502 | 3/1967 | Bednarz et al. | 17—21 |
| 3,046,597 | 7/1962 | Macy et al. | 17—21 |
| 3,129,454 | 4/1964 | Johnson | 17—21 |
| 3,192,558 | 7/1965 | Niccollai | 17—21 |
| 3,209,395 | 10/1965 | Jones et al. | 17—21 |
| 3,324,505 | 6/1967 | Crawford et al. | 17—45 |

LUCIE H. LAUDENSLAGER, Primary Examiner